(12) United States Patent
Price et al.

(10) Patent No.: US 9,429,069 B2
(45) Date of Patent: Aug. 30, 2016

(54) OPEN BRAYTON BOTTOMING CYCLE AND METHOD OF USING THE SAME

(71) Applicants: StarRotor Corporation, College Station, TX (US); The Texas A&M University System, College Station, TX (US)

(72) Inventors: Dan Price, Houston, TX (US); Mark T. Holtzapple, College Station, TX (US)

(73) Assignee: StarRotor Corporation, College Station, TX (US)

(*) Notice: Subject to any disclaimer, the term of this patent is extended or adjusted under 35 U.S.C. 154(b) by 106 days.

(21) Appl. No.: 13/738,824

(22) Filed: Jan. 10, 2013

(65) Prior Publication Data

US 2013/0192192 A1    Aug. 1, 2013

Related U.S. Application Data

(60) Provisional application No. 61/585,060, filed on Jan. 10, 2012.

(51) Int. Cl.
| | |
|---|---|
| *F02C 6/18* | (2006.01) |
| *F01K 23/10* | (2006.01) |
| *F02C 3/36* | (2006.01) |
| *F02C 1/04* | (2006.01) |
| *F01K 21/04* | (2006.01) |
| *F01K 27/00* | (2006.01) |

(52) U.S. Cl.
CPC ............... *F02C 3/36* (2013.01); *F01K 21/04* (2013.01); *F01K 23/10* (2013.01); *F01K 27/00* (2013.01); *F02C 1/04* (2013.01); *F02C 6/18* (2013.01); *Y02E 20/16* (2013.01)

(58) Field of Classification Search
CPC .............................. F01K 23/10; Y02E 20/16
USPC ............................................ 60/39.183, 39.53
See application file for complete search history.

(56) References Cited

U.S. PATENT DOCUMENTS

| | | | | |
|---|---|---|---|---|
| 3,898,439 | A * | 8/1975 | Reed et al. | 700/287 |
| 4,492,085 | A * | 1/1985 | Stahl et al. | 60/649 |
| 4,751,814 | A * | 6/1988 | Farrell | 60/39.183 |
| 4,785,621 | A * | 11/1988 | Alderson et al. | 60/39.12 |
| 4,922,709 | A * | 5/1990 | Hendriks | 60/39.183 |
| 5,165,239 | A * | 11/1992 | Bechtel et al. | 60/683 |
| 5,442,904 | A * | 8/1995 | Shnaid | 60/783 |
| 5,617,719 | A * | 4/1997 | Ginter | 60/39.26 |
| 5,927,065 | A * | 7/1999 | Cotton | 60/39.183 |
| 5,934,065 | A * | 8/1999 | Bronicki et al. | 60/39.181 |
| 6,167,706 | B1 * | 1/2001 | Bronicki et al. | 60/651 |
| 6,178,735 | B1 * | 1/2001 | Frutschi | 60/772 |
| 7,069,726 | B2 * | 7/2006 | Frutschi | 60/772 |
| 7,770,376 | B1 * | 8/2010 | Brostmeyer | 60/39.182 |
| 8,205,456 | B1 * | 6/2012 | Brostmeyer | 60/774 |
| 2001/0000049 | A1 * | 3/2001 | Kataoka et al. | 60/39.05 |
| 2002/0014069 | A1 * | 2/2002 | Holtzapple et al. | 60/39.63 |

(Continued)

*Primary Examiner* — Phutthiwat Wongwian
*Assistant Examiner* — Rene Ford

(57) ABSTRACT

According to one embodiment, an open brayton bottoming cycle includes a heat exchanger configured between a compressor and an expander. The heat exchanger is configured to receive heat from a heat source and supply at least a portion of the exhaust heat to an expander using a fluid. The compressor configured to supply compressed fluid to the heat exchanger. The expander has a shaft connected to the compressor and configured to supply energy to the compressor. At least one of the compressor or the expander has an efficiency greater than 80 percent.

14 Claims, 16 Drawing Sheets

(56) References Cited

U.S. PATENT DOCUMENTS

| | | | |
|---|---|---|---|
| 2002/0139105 A1* | 10/2002 | Horii et al. | 60/39.3 |
| 2002/0197156 A1* | 12/2002 | Haller | 415/192 |
| 2003/0228237 A1* | 12/2003 | Holtzapple et al. | 418/171 |
| 2004/0011047 A1* | 1/2004 | Reissig | 60/772 |
| 2004/0055273 A1* | 3/2004 | Hirayama et al. | 60/39.281 |
| 2004/0070373 A1* | 4/2004 | Nelson et al. | 322/28 |
| 2005/0204745 A1* | 9/2005 | Hirayama et al. | 60/773 |
| 2006/0201132 A1* | 9/2006 | Hirayama et al. | 60/39.27 |
| 2007/0237665 A1* | 10/2007 | Holtzapple et al. | 418/61.3 |

* cited by examiner

Table 1. Water consumption. (Pressure ratio = 6:1, $\Delta T_{approach}$ = 50 K, configurations of FIGURES 6 and 7 employ 35°C intercooler)

| Compressor Efficiency | | 80% | | | 85% | | | 90% | | |
|---|---|---|---|---|---|---|---|---|---|---|
| Compression | | Energy (MWh) | Water (m³/MWh) | Water (m³) | Energy (MWh) | Water (m³/MWh) | Water (m³) | Energy (MWh) | Water (m³/MWh) | Water (m³) |
| One Stage[1] | Dry | 1.00 | – | – | 1.00 | – | – | 1.00 | – | – |
|  | Wet | 3.84 | 2.06 | 7.91 | 1.99 | 1.49 | 2.97 | 1.59 | 1.18 | 1.88 |
| Two Stage[2] | Dry | 1.00 | – | – | 1.00 | – | – | 1.00 | – | – |
|  | Wet | 1.60 | 1.02 | 1.63 | 1.34 | 0.75 | 1.01 | 1.23 | 0.60 | 0.74 |

Table 2. Economics. (Electricity = $50/MWh, Water = $1.00/m³ = $3.78/thous gal)

| Compressor Efficiency | | 80% | | | 85% | | | 90% | | |
|---|---|---|---|---|---|---|---|---|---|---|
| Compression | | Electricity Income ($) | Water Cost ($) | Net Income ($) | Electricity Income ($) | Water Cost ($) | Net Income ($) | Electricity Income ($) | Water Cost ($) | Net Income ($) |
| One Stage[1] | Dry | 50.00 | – | – | 50.00 | – | – | 50.00 | – | – |
|  | Wet | 192.00 | 7.91 | 184.09 | 99.50 | 2.97 | 96.53 | 79.50 | 1.88 | 77.62 |
| Two Stage[2] | Dry | 50.00 | – | – | 50.00 | – | – | 50.00 | – | – |
|  | Wet | 80 | 1.63 | 78.37 | 67.00 | 1.01 | 65.99 | 61.50 | 0.74 | 60.76 |

Table 3. Marginal benefit. (Electricity = $50/MWh, Water = $1.00/m³ = $3.78/thous gal)

| Compressor Efficiency | 80% | 85% | 90% |
|---|---|---|---|
|  | Marginal benefit ($ electricity/$ water) | Marginal benefit ($ electricity/$ water) | Marginal benefit ($ electricity/$ water) |
| One Stage[1] | 16.95 | 15.67 | 14.69 |
| Two Stage[2] | 17.40 | 15.83 | 14.54 |

1. Configuration of FIGURE 3 v. FIGURE 4  
2. Configuration of FIGURE 6 v. FIGURE 7

*FIG. 15*

OPEN BRAYTON BOTTOMING CYCLE AND METHOD OF USING THE SAME

CROSS-REFERENCE TO RELATED APPLICATION(S) AND CLAIM OF PRIORITY

The present application is related to U.S. Provisional Patent Application No. 61/585,060, filed Jan. 10, 2012, entitled "OPEN BRAYTON BOTTOMING CYCLE AND METHOD OF USING THE SAME". The present application hereby claims priority under 35 U.S.C. §119(e) to U.S. Provisional Patent Application No. 61/585,060, which is hereby incorporated by reference into the present application as if fully set forth herein.

TECHNICAL FIELD

The present disclosure is directed, in general, to gerotor systems, and more specifically, to an open brayton bottoming cycle and method of using the same.

BACKGROUND

A brayton cycle generally refers to a type of engine model in which a compressor works in conjunction with an expander to generate mechanical energy from a heat source that heats a fluid flow between the compressor and expander. A gas-turbine engine or jet engine are examples of engines that function according to the brayton cycle. An open brayton cycle is a particular type of brayton cycle in which the working fluid is open to the atmosphere; that is, the working fluid is air.

SUMMARY OF THE DISCLOSURE

According to an embodiment of the present disclosure, systems, devices, and methods are disclosed for an open brayton bottoming cycle and method of using the same.

According to one embodiment, an open brayton bottoming cycle includes a heat exchanger configured between a compressor and an expander. The heat exchanger is configured to receive heat from a heat source and supply at least a portion of the exhaust heat to an expander using a fluid. The compressor configured to supply compressed fluid to the heat exchanger. The expander has a shaft connected to the compressor and configured to supply energy to the compressor. At least one of the compressor or the expander has an efficiency greater than 80 percent.

According to another embodiment, an open brayton bottoming cycle method includes receiving, using a heat exchanger, heat from a heat source, the heat exchanger supplying at least a portion of the heat to an expander using a fluid. The compressed fluid is supplied to the heat exchanger using a compressor, and energy is supplied to the compressor using the expander. At least one of the compressor or the expander has an efficiency greater than 80 percent.

According to yet another embodiment, an open brayton bottoming cycle includes a heat exchanger configured between a compressor and an expander. The heat exchanger configured to receive exhaust heat from an engine and supply at least a portion of the exhaust heat to an expander using a fluid in which the expander has an inner rotor configured to spin inside an outer rotor. The compressor has an inner rotor configured to spin inside an outer rotor and is configured to supply compressed fluid to the heat exchanger using a shaft of the expander connected to the compressor. The cycle also includes a motor/generator component configured to initially be activated as a motor and then as speed increases, re-configure to become a generator that receives energy from the shaft of the expander, and a valve configured to trip when the motor/generator components trips and further configured to be throttled when less power is desired, and a water injector configured to supply a modulated water flow to the compressor, the modulated water flow modulating the volume entering the heater exchanger and the expander.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 15 includes Tables 1, 2, and 3 that show data on various parameters corresponding to the configurations described herein.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

Rankine Cycle

Waste heat may be generated from a variety of sources including, but not limited to, hot exhaust from diesel engines, gas turbines, and cement kilns. Conventionally, a Rankine cycle has been employed to capture the waste heat and convert it to electrical power.

Figure 1:
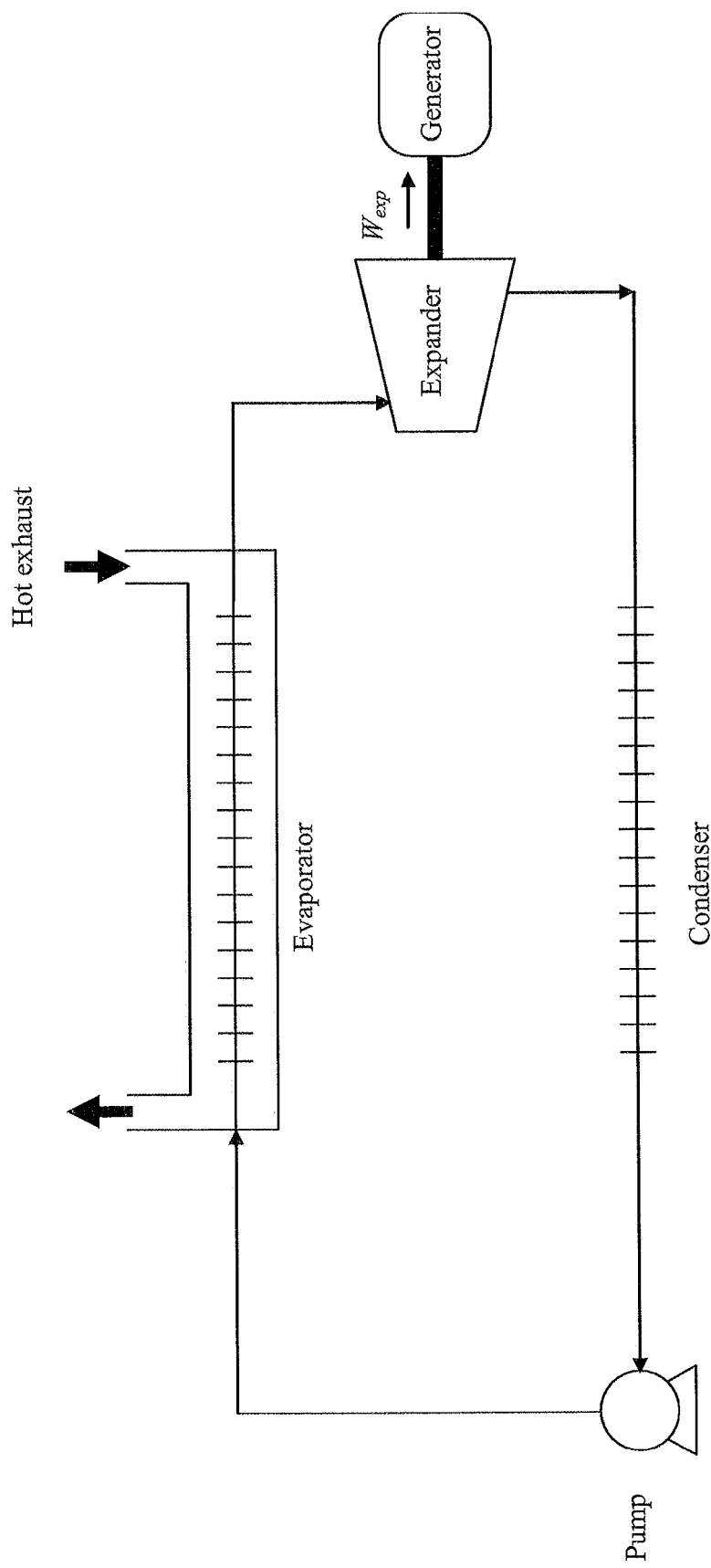
FIG. 1 shows an example of a conventional Rankine cycle.

FIG. 1 shows an example of a conventional Rankine cycle. High-pressure working fluid is vaporized in an evaporator, which produces high-pressure vapor. The high-pressure vapor flows through an expander to produce shaft power, which generates electricity. The low-pressure vapors exiting the expander are condensed in a condenser. A liquid pump pressurizes the liquid condensate, which completes the cycle.

In large power plants, water is typically used as the working fluid. Smaller systems are typically organic Rankine cycles (ORC), which employ organic working fluids rather than water. Organic working fluids have the following advantages:
- At condenser temperatures, they generally have a higher density than water vapor, so the expander is smaller than a steam cycle.
- Organics tend to be less corrosive than water.
- There are fewer legal restrictions associated with the use of organic working fluids.

At lower temperatures, refrigerants (e.g., R245fa) are favored. At higher temperatures, thermally stable organics (e.g., toluene) are required.

ORC waste heat systems have the following challenges:
- Capturing high-temperature heat requires a thermally stable working fluid (e.g., toluene, methanol), which is combustible and/or toxic. Most customers are not willing to accept this liability, so heat is not captured at high temperatures, which reduces system efficiency. Nonflammable and nontoxic refrigerants are not stable at high temperatures. R245fa, one of the most popular refrigerants, is unsuitable above about 300° C.
- ORC working fluids tend to dissolve lubricating oils. The oils can be carried to the evaporator and potentially form carbon deposits that reduce heat transfer. Special oils are required, which can be expensive.
- The condenser temperature will track the ambient temperature. Because vapor pressure is an exponential function of temperature, the condenser pressure varies widely with the seasons. To take full advantage of the efficiency gains that result from rejecting heat at the lowest temperature possible, the pressure ratio across the expander varies widely with the seasons, making control difficult.
- The working fluids are expensive and are potentially toxic or flammable; therefore, it is important that the shaft seals not leak appreciably. Such seals are expensive and require maintenance.

Brayton Cycle

As an alternative to the Rankine cycle, the Brayton cycle overcomes the above-listed problems. Rather than using a condensable working fluid, the Brayton cycle uses a gas. The cycles are similar, except the liquid pump of the Rankine cycle is replaced by a compressor in the Brayton cycle.

Traditionally, the Brayton cycle has not been used to convert waste heat to power because compressor efficiencies have been too low, particularly at small scale. The liquid pump of the Rankine cycle requires much less power than the compressor of the Brayton cycle, so pump inefficiencies can be tolerated without impacting the cycle efficiency greatly. In contrast, low compressor efficiencies have a devastating effect on the cycle efficiency.

Certain embodiments of the disclosure recognize that the key to making a practical Brayton cycle engine that converts low-grade waste heat to shaft power is high-efficiency compressors and expanders. In particular, they must be efficient at small scale, which is where most waste heat is produced.

Such high efficiency compressors and expanders have been developed by StarRotor Corporation, an assignee of the present application. Non-limiting examples of such highly efficient compressors and expanders are disclosed in U.S. Pat. Nos. 6,336,317 and 7,008,200, which are incorporated herein by reference.

Figure 2:
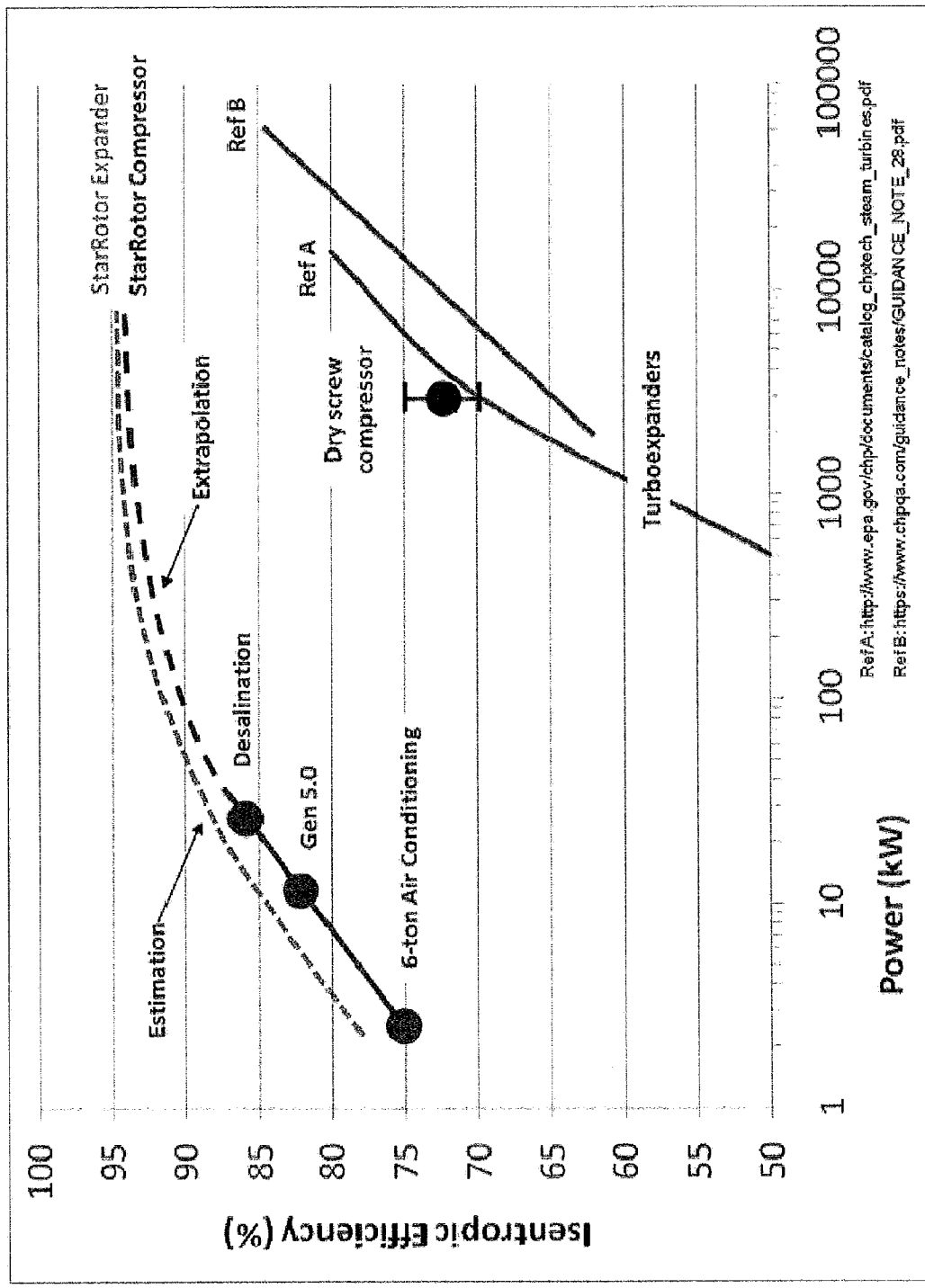
FIG. 2 shows that the efficiency of StarRotor compressors and expanders is high, even at small scale.

FIG. 2 shows that the efficiency of StarRotor compressors and expanders is high, even at small scale. Thus, StarRotor compressors and expanders provide an enabling technology that allows the Brayton cycle to be employed. The following benefits may be realized:
- The working fluid is air, so it is free.
- Air is stable so there are no practical temperature limits.
- Air does not dissolve lubricating oil, so it is not washed out of bearings and will not enter the high-temperature heat exchanger and form carbon deposits that foul the heat exchanger surface.
- Air is nontoxic and nonflammable.
- Air can leak out of shaft seals with no adverse consequences, so low-cost shaft seals can be employed.
- The system can operate at a fixed compression ratio regardless of ambient temperatures, which makes control much easier.
- The system can operate at a fixed pressure ratio regardless of engine throttle. As note in this regard, if the engine is highly throttled, less thermal energy is available in the exhaust gas, which will reduce the temperature of the air entering the expander of the Brayton cycle. At lower temperatures, both the efficiency and amount of work production will reduce; however, there is no need to adjust the compression ratio of the Brayton cycle engine to match the throttled condition. The Brayton cycle will self-adjust; however, it will be necessary to make adjustments in the generator to reduce torque if a constant speed is desired.
- It is not necessary to have a low-temperature heat exchanger, which eliminates a major capital expense.

Brayton Cycle Configurations

The following describes a variety of Brayton cycle configurations for converting waste heat to shaft power. Certain comparisons of each configuration are also provided. Although particular components will be shown, it should be understood that more, less, or different components may be utilized. Additionally, although certain components will be described with singular systems (e.g., single stage), more than one of such components may be utilized (e.g., multiple stage). Moreover, although particular discussion will be provided for only one configuration, it should be understood that other configurations may have similar features.

Figure 3:
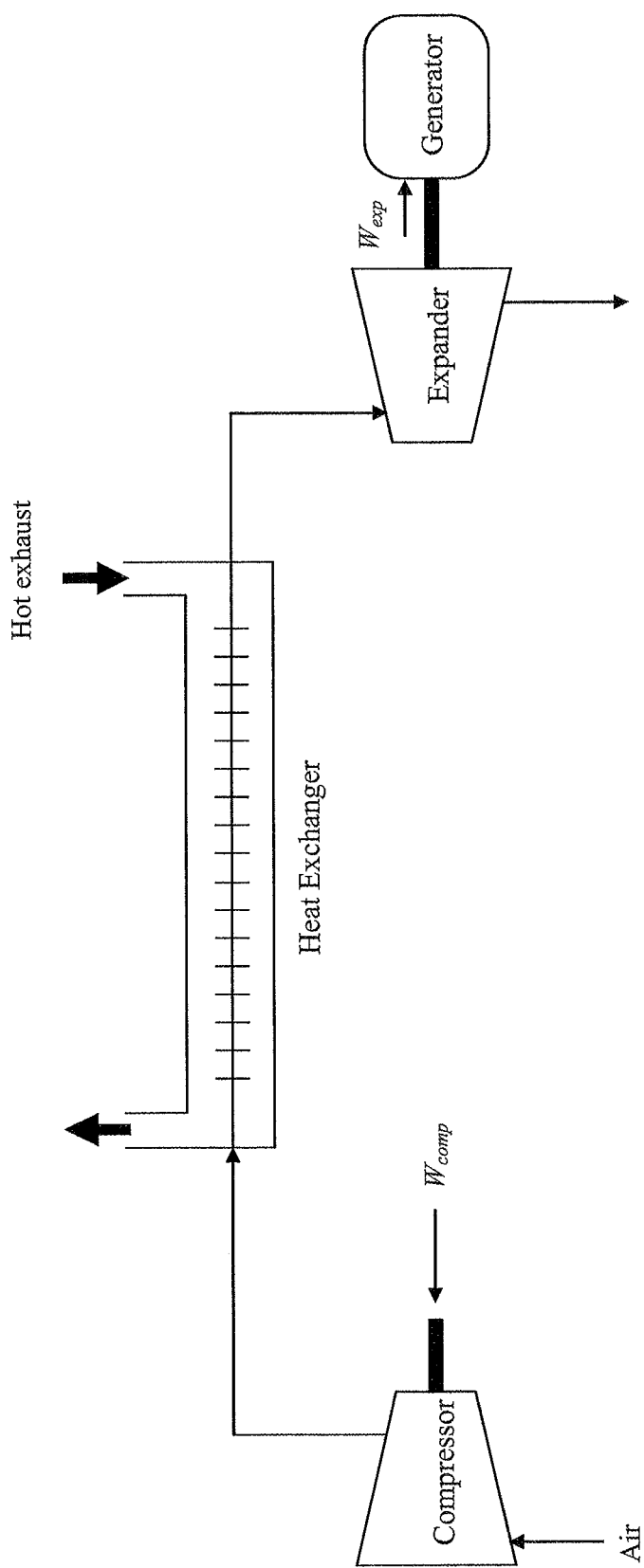
FIG. 3 shows a first Brayton cycle configuration for converting waste heat to shaft power, according to an embodiment of the disclosure.

FIG. 3 shows a first Brayton cycle configuration for converting waste heat to shaft power, according to an embodiment of the disclosure. In the embodiment of FIG. 3, the Brayton cycle configuration has a single stage dry compressor and an expander coupled to a generator. The compressors and expanders may be the StarRotor compressor and expanders described supra. The heat exchanger may be any suitable device for capturing thermal energy from the hot exhaust for transfer to the expander. In particular embodiments, the compressor and expander may be on a single shaft and the generator may double as a motor, for example, as described with reference to FIG. 16.

Figure 4:
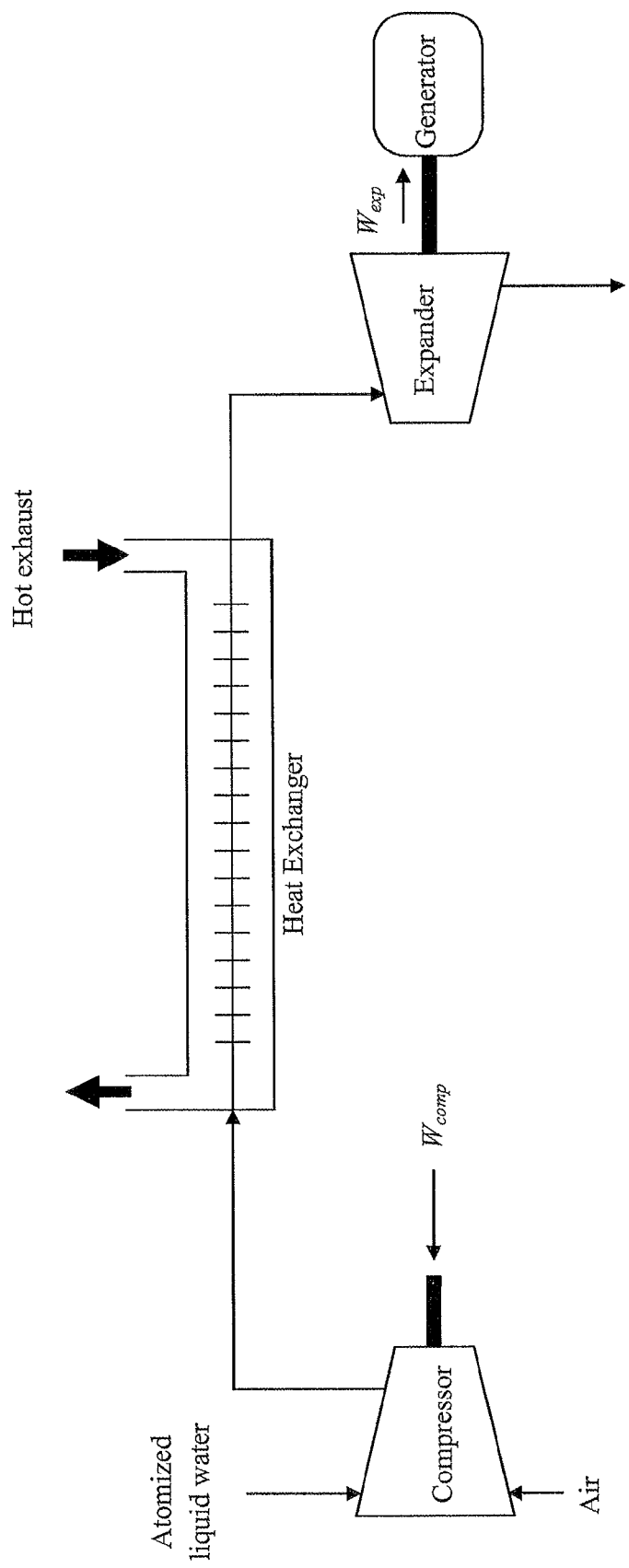
FIG. 4 shows another Brayton cycle configuration for converting waste heat to shaft power, according to an embodiment of the disclosure.

FIG. 4 shows another Brayton cycle configuration for converting waste heat to shaft power, according to an embodiment of the disclosure. The configuration of FIG. 4 is similar to the configuration of FIG. 3 except that the Brayton cycle of FIG. 4 has a single-stage wet compressor. Atomized liquid water, which may have droplets on the order of 2- to 3-□m diameter, is injected at the inlet, which keeps the compressor cool. A variety of configurations may be utilized in applying such water to keep the compressor cool. Additionally, the droplets may have varying size. Further details of water injection are also provided with reference to FIG. 16.

Figure 5:
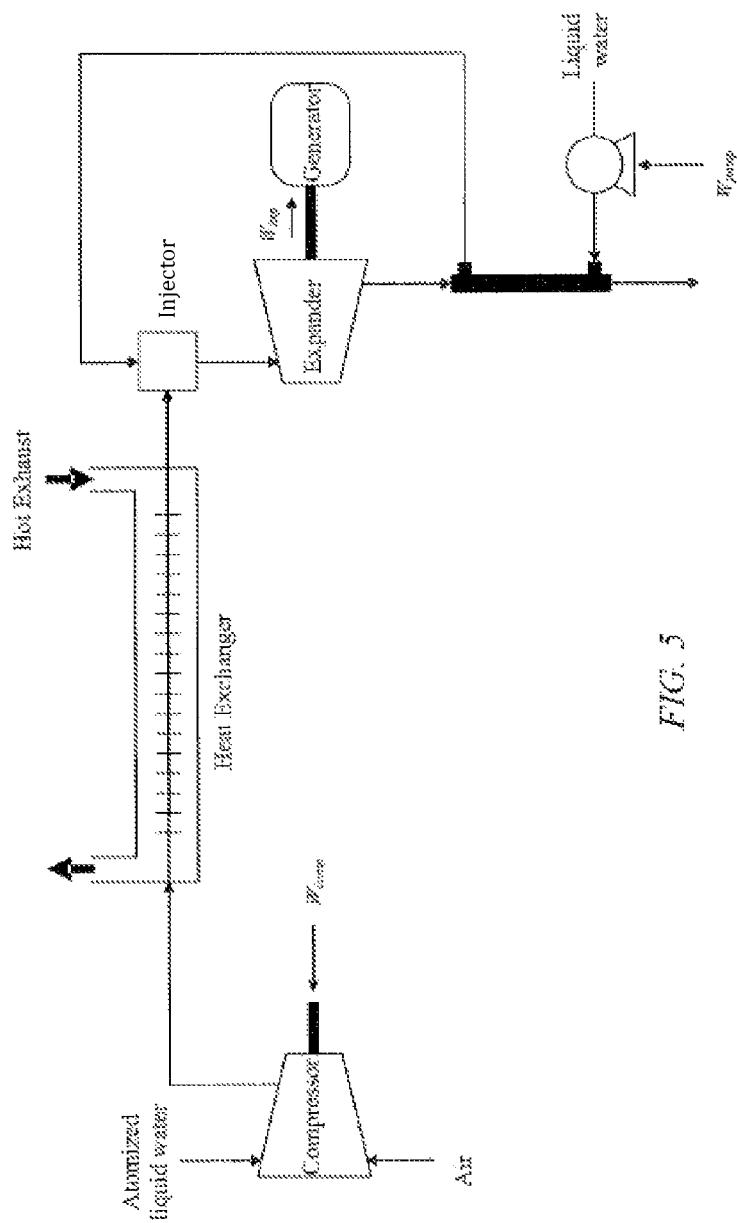
FIG. 5 shows another Brayton cycle configuration for converting waste heat to shaft power, according to an embodiment of the disclosure.

FIG. 5 shows another Brayton cycle configuration for converting waste heat to shaft power, according to an embodiment of the disclosure. The configuration of FIG. 5 is similar to the configuration of FIG. 4 except that the Brayton cycle of FIG. 5 additionally shows hot atomized liquid water being injected prior to the expander.

Figure 6:
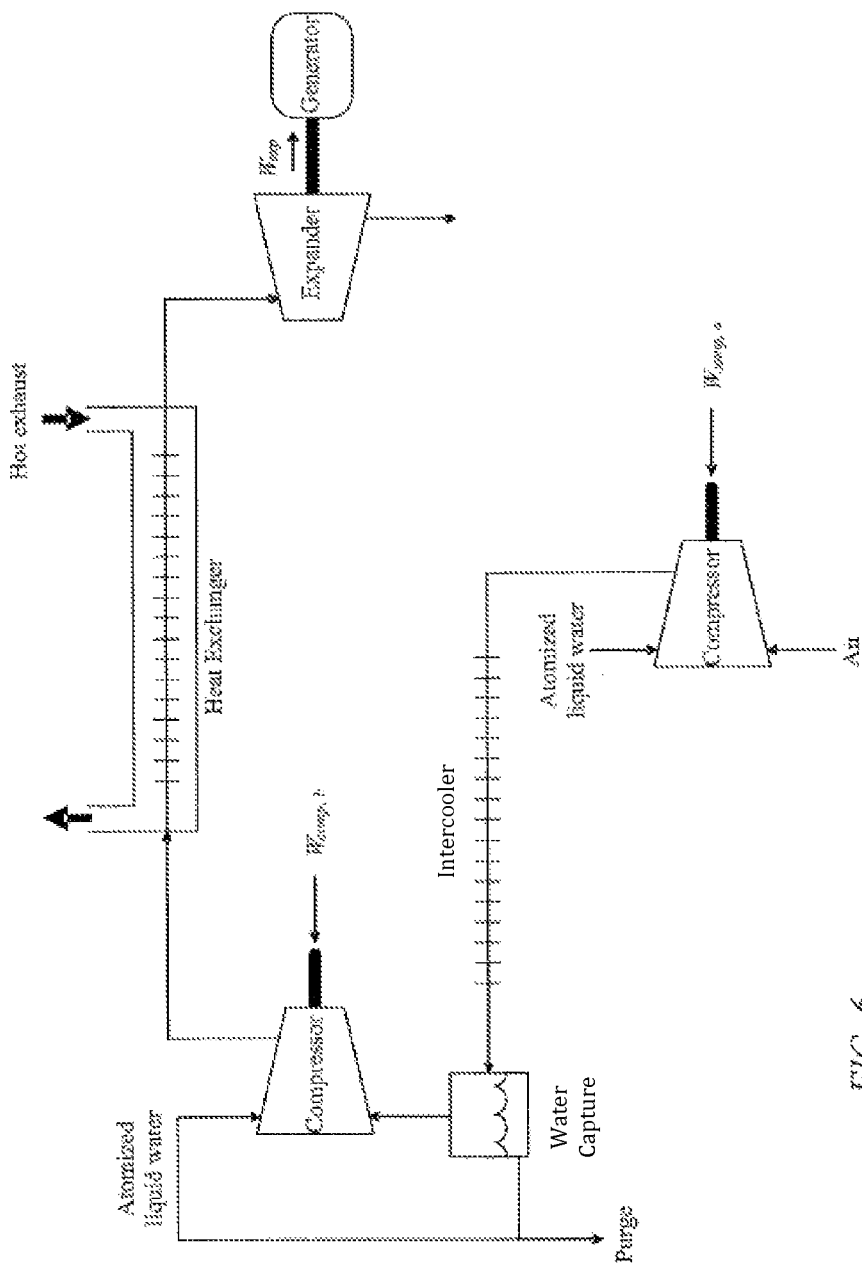
FIG. 6 shows yet another Brayton cycle configuration for converting waste heat to shaft power, according to an embodiment of the disclosure.

FIG. 6 shows yet another Brayton cycle configuration for converting waste heat to shaft power, according to an embodiment of the disclosure. The configuration of FIG. 6 is similar to the configuration of FIG. 4 except that intercooling may be utilized between compressor stages.

Figure 7:
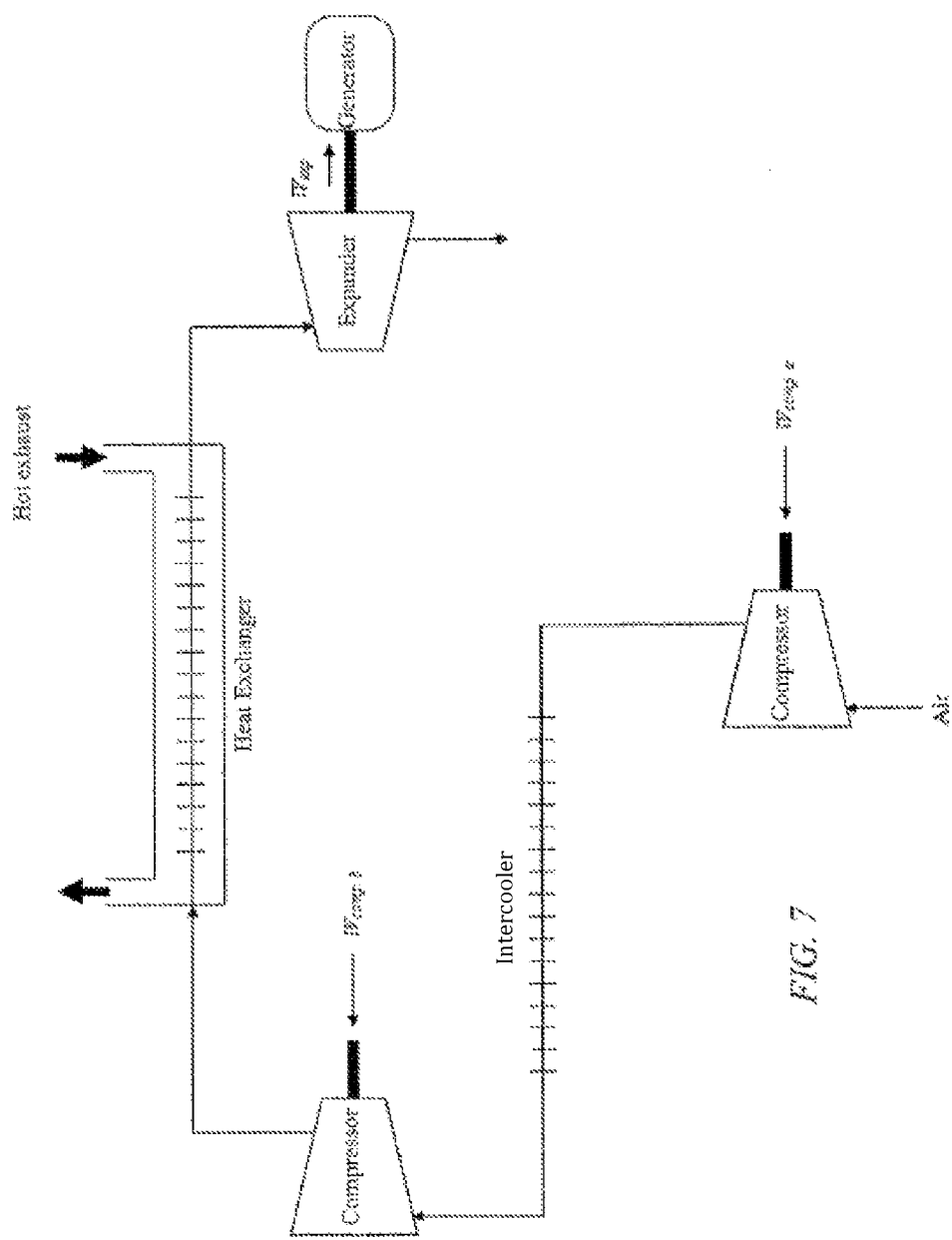
FIG. 7 shows yet another Brayton cycle configuration for converting waste heat to shaft power, according to an embodiment of the disclosure.

FIG. 7 shows yet another Brayton cycle configuration for converting waste heat to shaft power, according to an embodiment of the disclosure. The configuration of FIG. 7 is similar to the configuration of FIG. 6 except that FIG. 7 utilizes intercooling between dry compressors.

Comparison of Brayton Cycle Configurations

Figure 8:
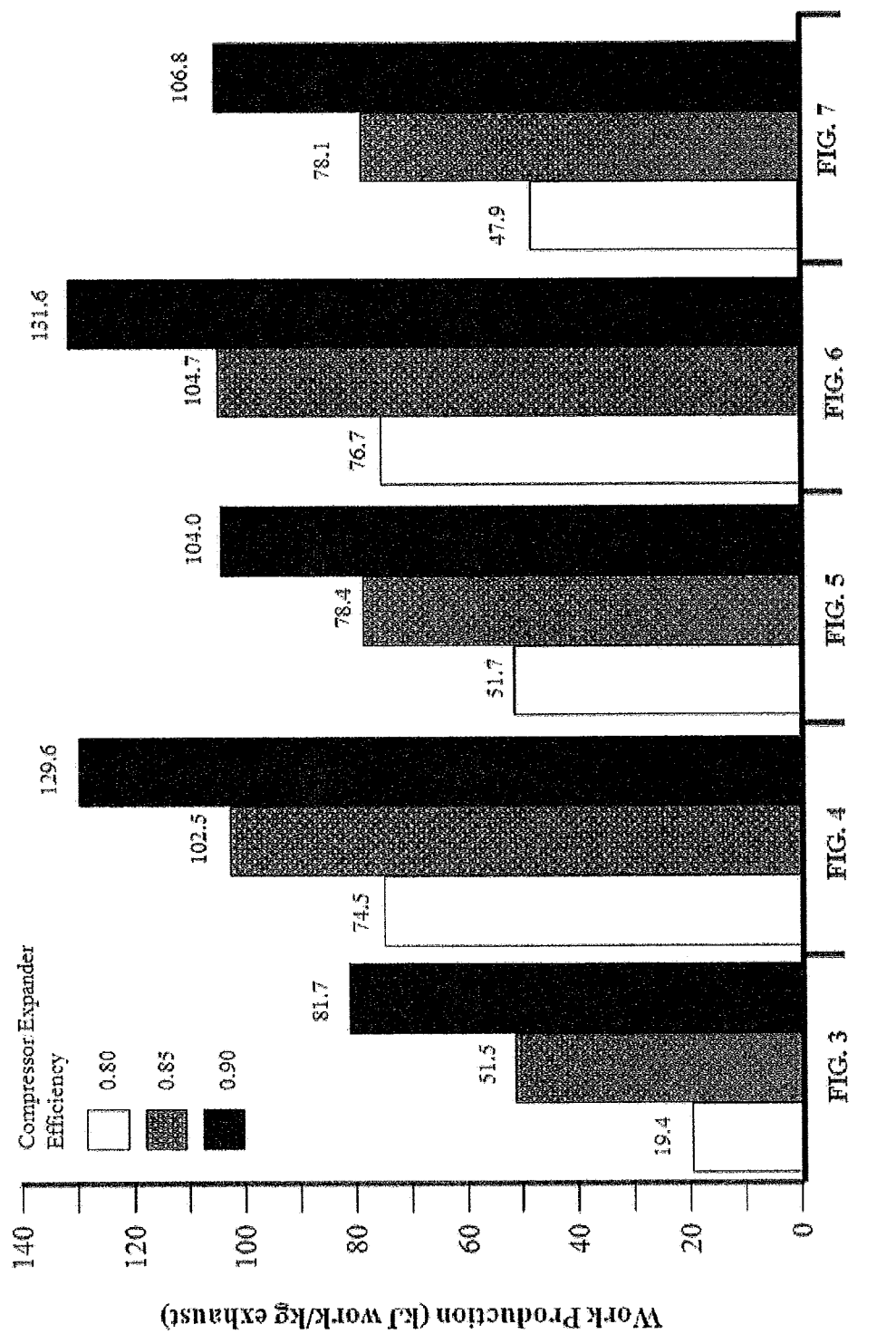
FIG. 8 shows a calculated comparison of the work production (kJ work/kg exhaust) by each of the Brayton cycle configurations above at a variety of compressor/expander efficiencies (80, 85, 90%)

FIG. 8 shows a calculated comparison of the work production (kJ work/kg exhaust) by each of the Brayton cycle configurations above at a variety of compressor/expander efficiencies (80, 85, 90%). In all cases, the waste heat was assumed to be from a diesel engine at 600° C. Further, it was assumed that the approach temperature in the heat exchanger was 50 K. In all cases, the net work output is reported at the shaft. If the shaft is coupled to a generator, the effect of generator efficiency must be included to calculate the net production of electricity.

Of the configurations shown in FIGS. 3-7, the configuration in FIG. 3 has the lowest performance. Because the compressor temperature increased, it increased the parasitic work required from the expander. Further, because the compressor discharge was hot, it was not possible to cool the exhaust to low temperatures; thus, less waste heat was captured.

Of the configurations shown in FIGS. 3-7, the configuration in FIG. 4 has excellent performance. The water spray cools the compressor, which reduces the work requirement. Further, the compressor discharge was relatively cool, which allows more heat to be extracted from the exhaust. As a note in this regard, the maximum amount of water was added so the compressor discharge was saturated with moisture.

Of the configurations shown in FIGS. 3-7, the configuration in FIG. 5 has good performance. However, adding liquid water prior to the expander reduced power production. The liquid water vaporized, which cooled the expander inlet and reduced cycle efficiency. In this case, liquid water cooled the expander inlet to 427° C.

Of the configurations shown in FIGS. 3-7, the configuration in FIG. 6 has the best performance, being slightly higher than the performance for the configuration in FIG. 4. Intercooling reduces the required parasitic work from the expander and it allows more waste heat to be extracted from the exhaust.

Of the configurations shown in FIGS. 3-7, the configuration in FIG. 7 has good performance, being similar to the performance of the configuration in FIG. 5.

Of the configurations shown in FIG. 3-7, FIGS. 4, 6, and 7 were the highest performers.

Figure 9A:
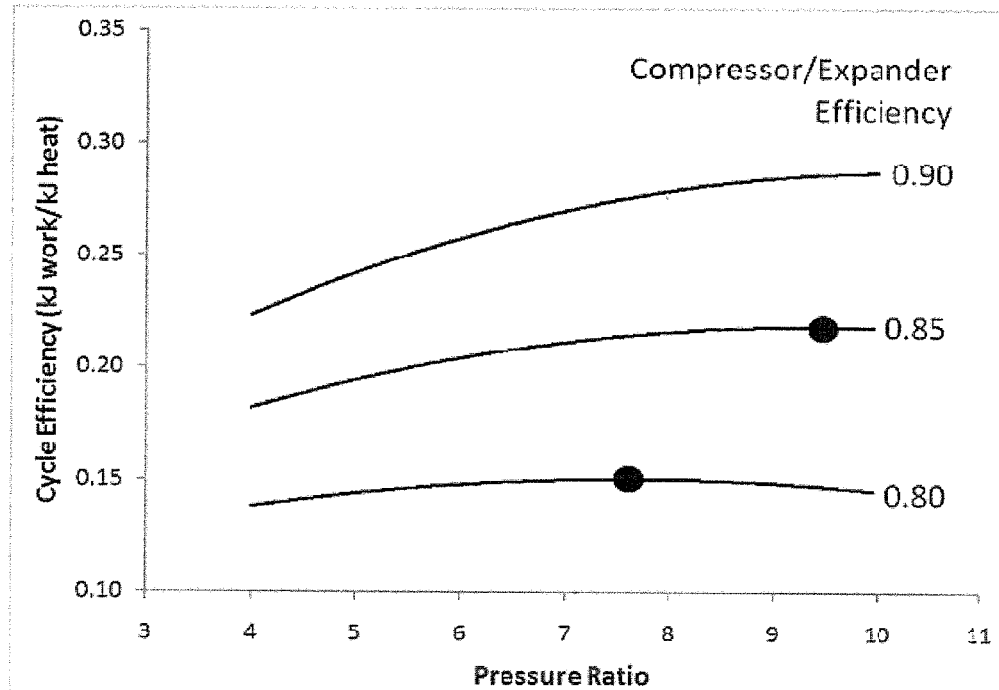
FIGS. 9A-9B show the cycle efficiency (kJ work/kg heat) and work production (kJ work/kg exhaust) for the configuration in FIG. 4.
Figure 9B:
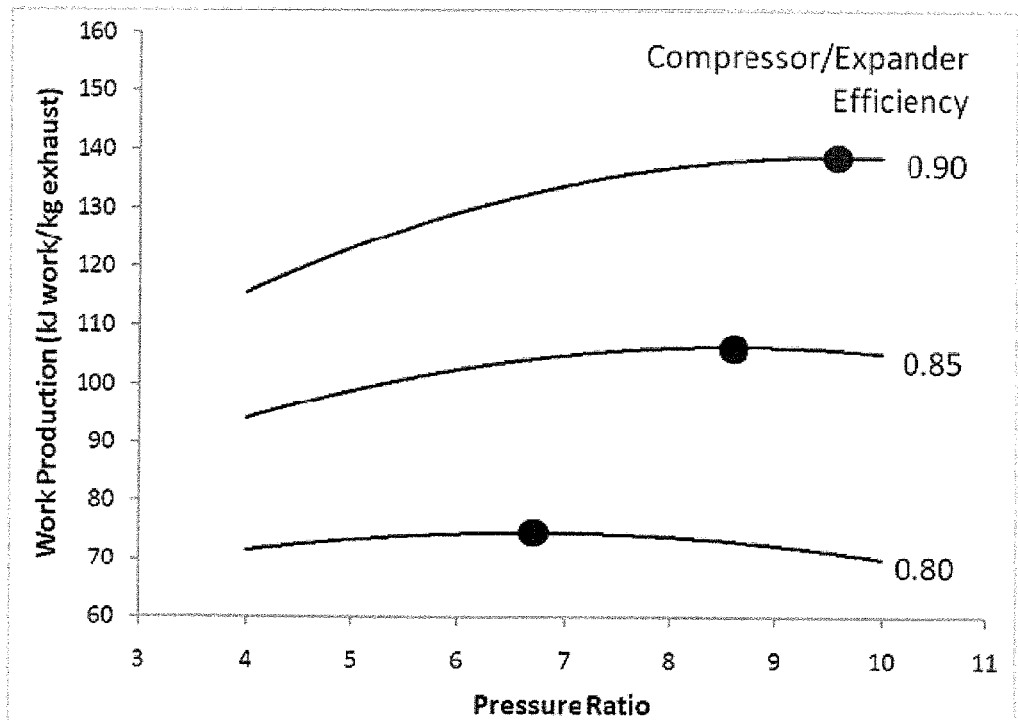

FIGS. 9A-9B show the cycle efficiency (kJ work/kg heat) and work production (kJ work/kg exhaust) for the configuration in FIG. 4.

Figure 10A:
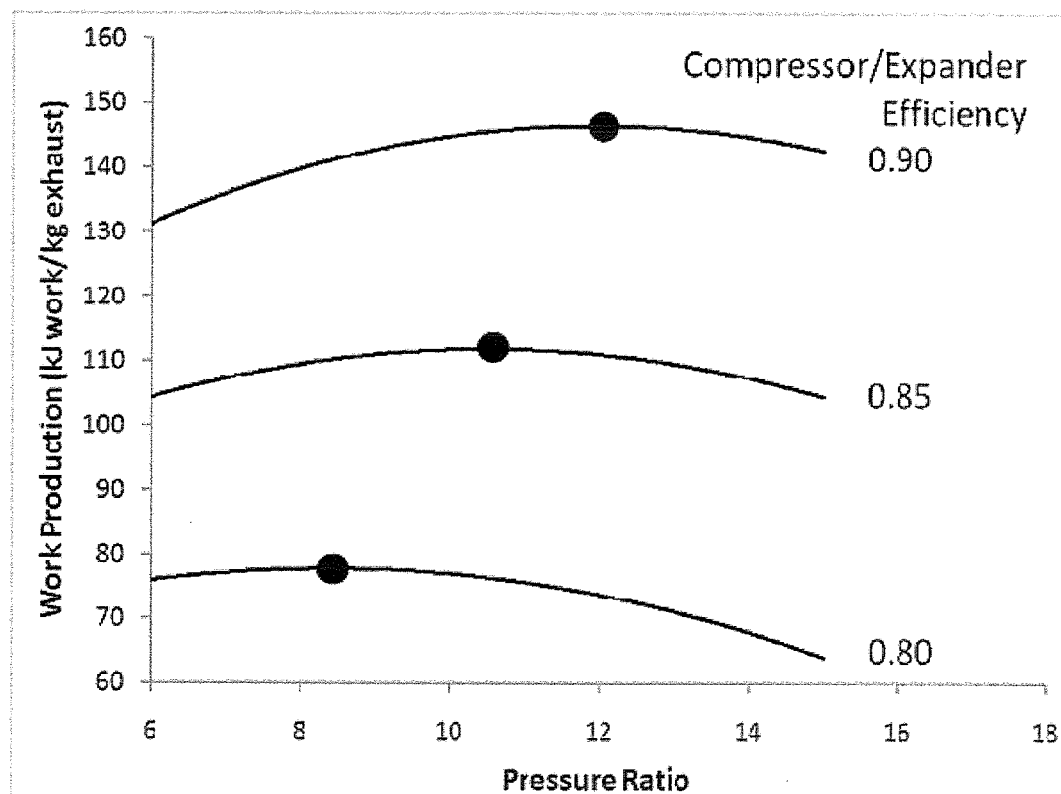
FIGS. 10A-10B show the cycle efficiency (kJ work/kg heat) and work production (kJ work/kg exhaust) for the configuration in FIG. 6.
Figure 10B:
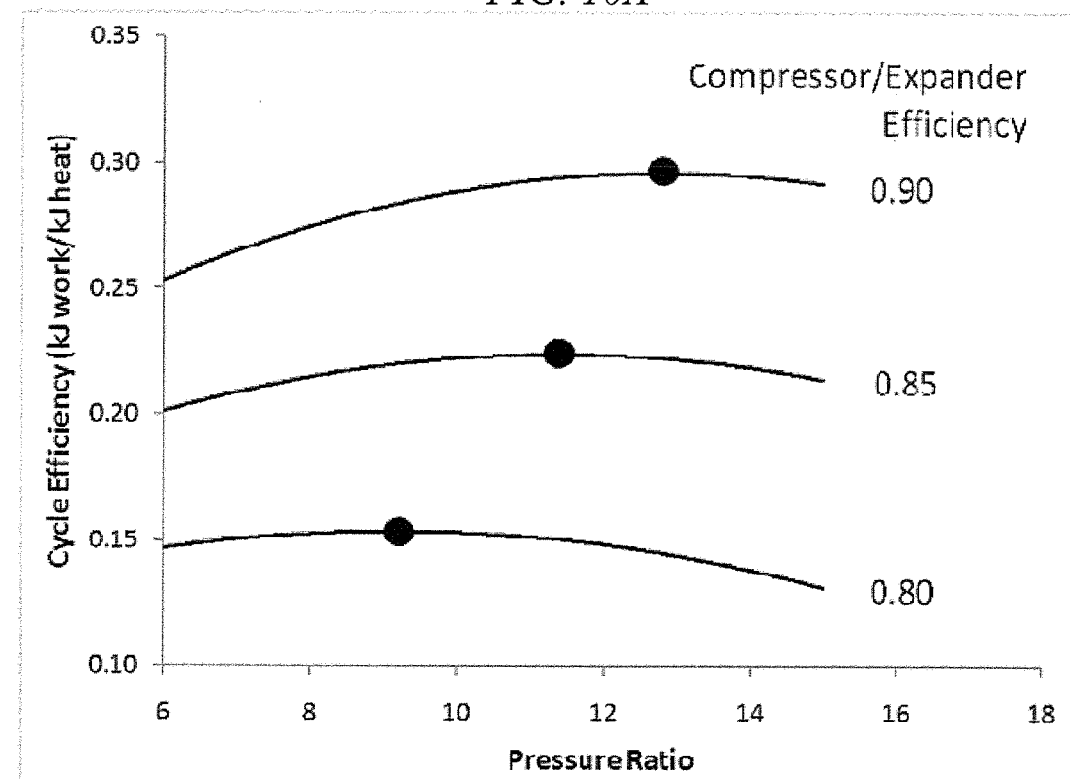

FIGS. 10A-10B show the cycle efficiency (kJ work/kg heat) and work production (kJ work/kg exhaust) for the configuration in FIG. 6.

Figure 11A:
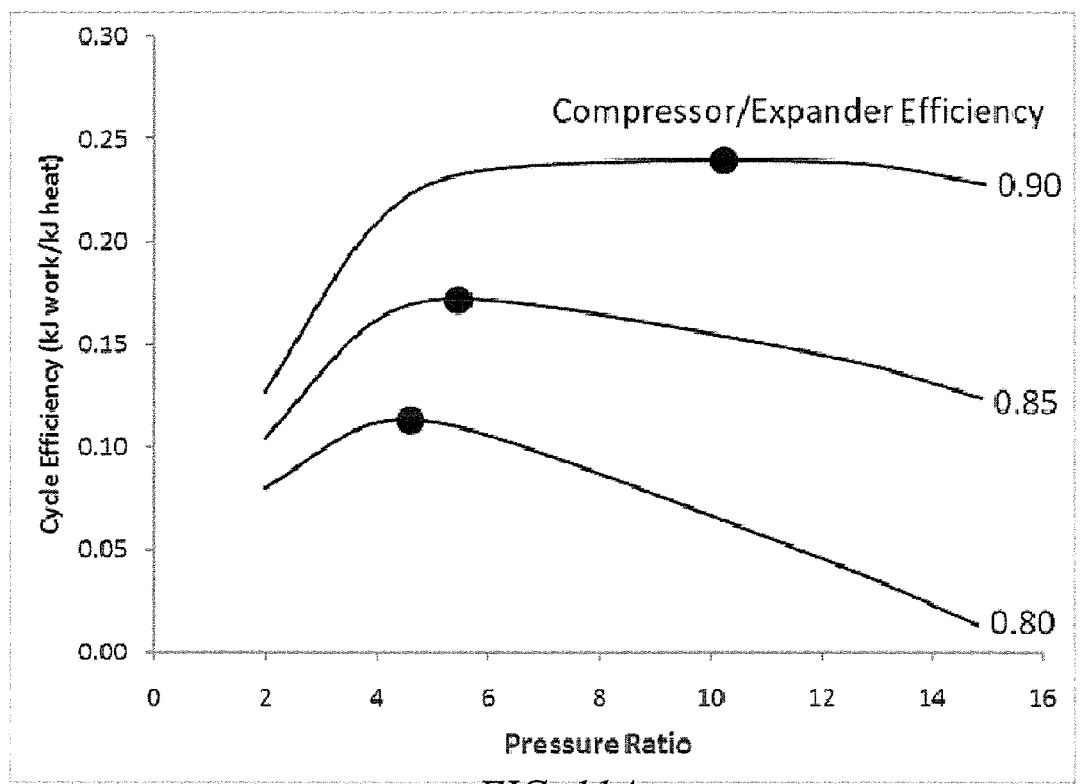
FIGS. 11A-11B show the cycle efficiency (kJ work/kg heat) and work production (kJ work/kg exhaust) for the configuration in FIG. 7.
Figure 11B:
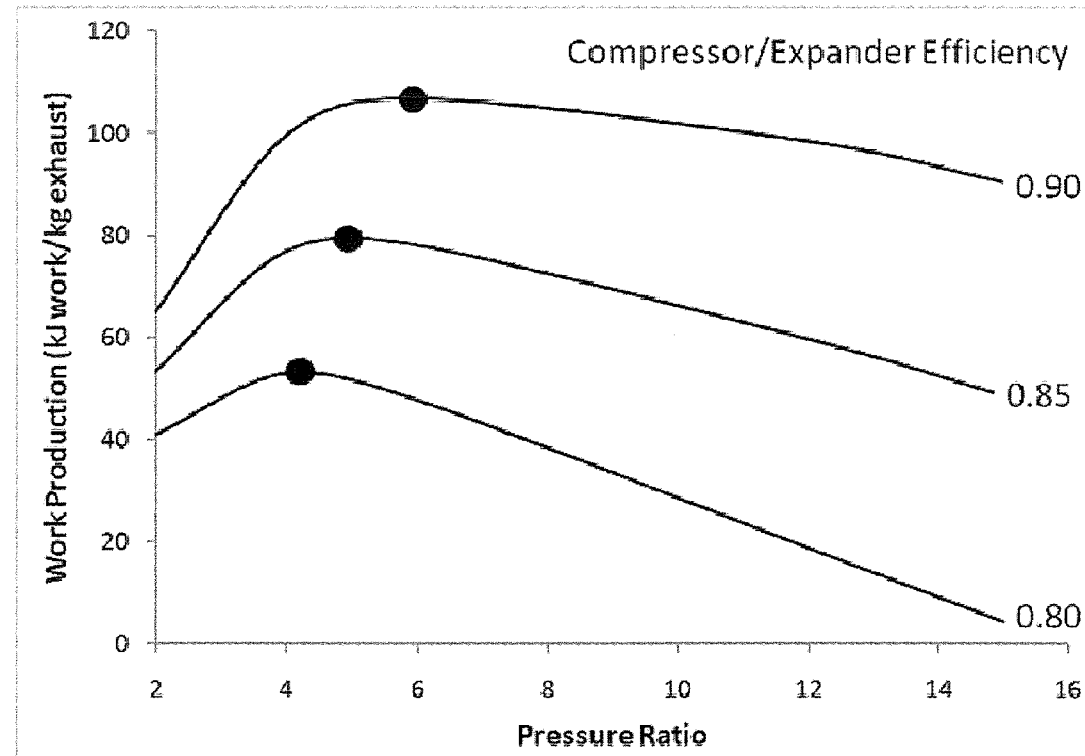

FIGS. 11A-11B show the cycle efficiency (kJ work/kg heat) and work production (kJ work/kg exhaust) for the configuration in FIG. 7.

Configuration in FIG. 3 vs. Configuration in FIG. 4

The configurations in FIGS. 3 and 4 both employ single-stage compression; however, the configuration in FIG. 4 also employs water injection. Water injection increases electricity production by a factor of 1.6 (90% efficiency) to 3.8 (80% efficiency).

Configuration in FIG. 6 vs. Configuration in FIG. 7

The configuration in FIGS. 6 and 7 both employ single-stage compression; however, the configuration in FIG. 6 also employs water injection. Water injection increases electricity production by a factor of 1.2 (90% efficiency) to 1.6 (80% efficiency).

Configuration in FIG. 4 vs. Configuration in FIG. 6

Comparing FIGS. 9 and 10, at the optimal pressure ratio (shown by the closed circles), the configuration in FIG. 6 produces about 5% more power than the configuration in FIG. 4. Further, the optimal pressure ratio is higher for the configuration in FIG. 6, so the equipment is more intense and hence smaller for the same power output. Because the optimal pressure ratios are relatively high (7 to 12), it is necessary to break the compression into two stages. The marginal cost of intercooling is modest, so these gains are achieved cost effectively. Breaking the compression into two stages reduces the amount of water that must be vaporized in each stage, which makes it easier for the atomized liquid to vaporize.

Brayton vs. Rankine

The Brayton cycle efficiencies (15 to 30%) are higher than those typically encountered in Rankine cycles that employ R245fa (10 to 15%).

Waste Heat Approach Temperature

Figure 12:
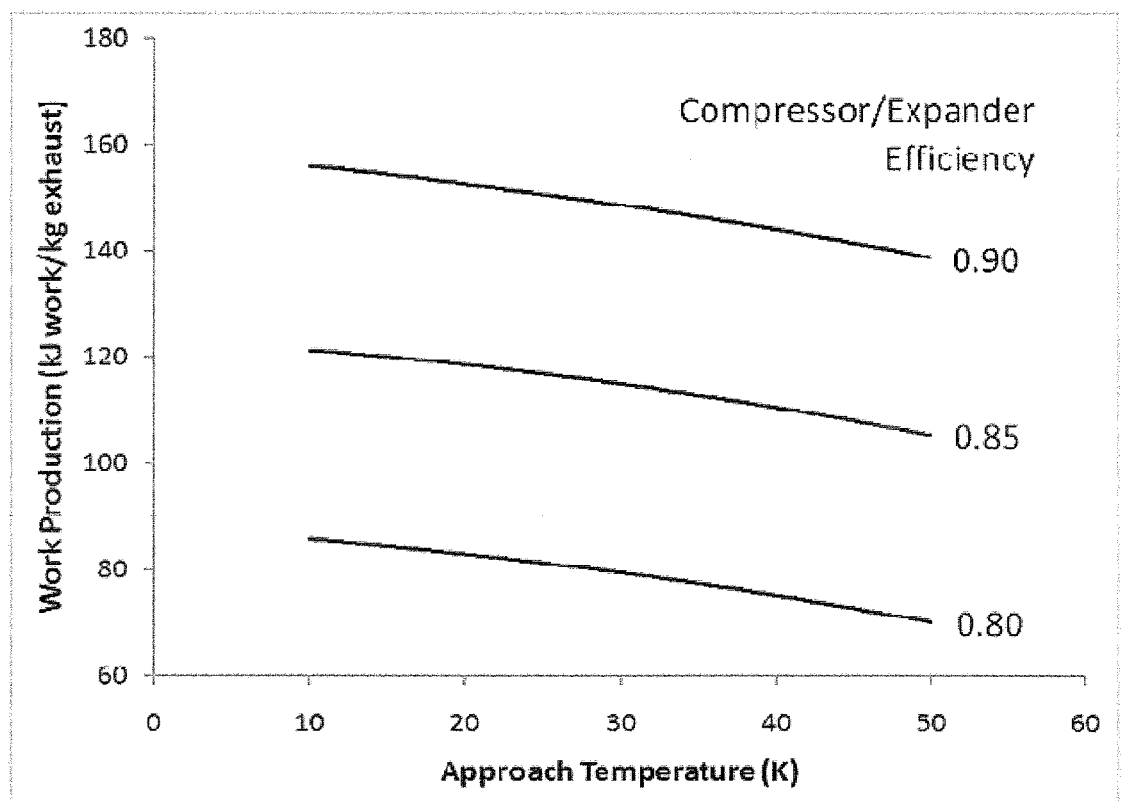
FIG. 12 shows the effect of approach temperature for the configuration of FIG. 4.

FIG. 12 shows the effect of approach temperature for the configuration of FIG. 4. Lowering the approach temperature from 50 to 10 K increases work production by 12 to 21%, with greater benefits at lower compressor/expander efficiencies. Because the configurations of FIGS. 4 and 6 are similar, it is expected that similar gains will be exhibited with the configuration of FIG. 6.

Intercooler Temperature

Figure 13:
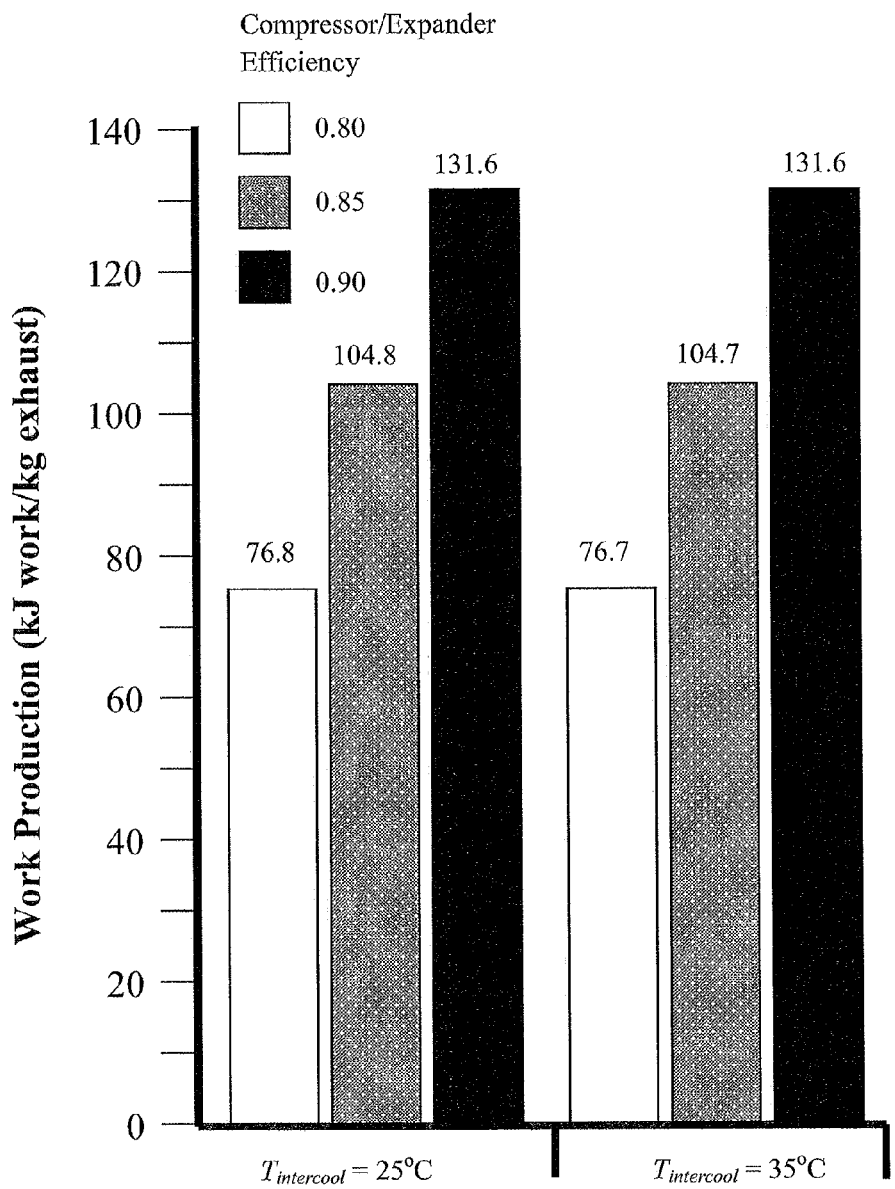
FIG. 13 shows the effect of intercooler temperature for the configuration of FIG. 6.

FIG. 13 shows the effect of intercooler temperature for the configuration of FIG. 6. There is little difference between 25 and 35° C., so it is not necessary to take extraordinary steps to reduce the intercooler temperature.

Equipment Size

Figure 14:
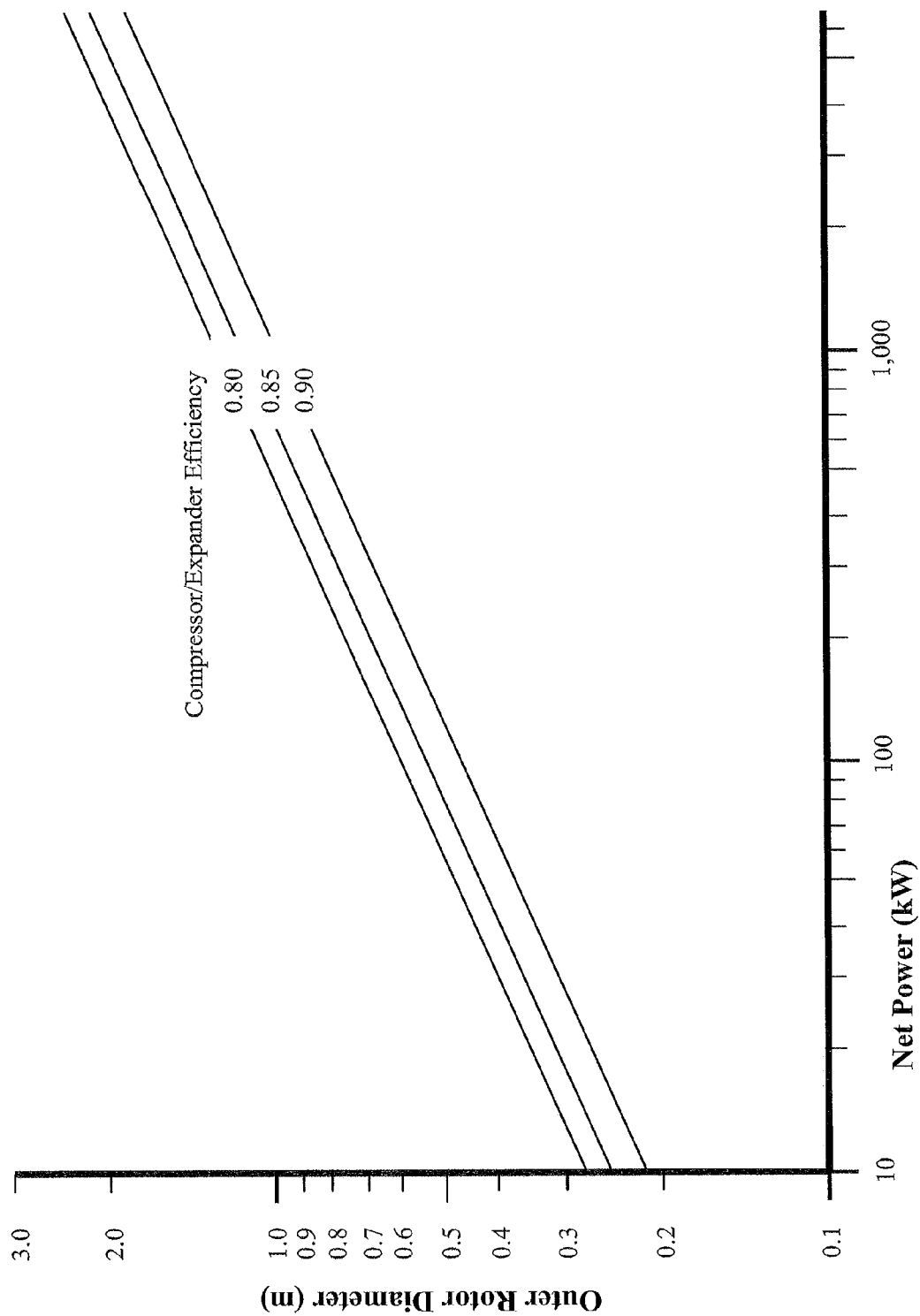
FIG. 14 shows the estimated outer rotor diameter of the second-stage expander for the configuration of FIG. 6.

FIG. 14 shows the estimated outer rotor diameter of the second-stage expander for the configuration of FIG. 6. Although FIG. 6 shows only a single stage for the expander, in practice, two stages are required. This rotor may be selected because it is the largest of the rotating equipment. The size of the rotating equipment is acceptable.

Water Consumption

FIG. 15 includes Tables 1, 2, and 3. Table 1 shows the effect of water injection on electricity production for both one-stage (the configurations of FIGS. 3 and 4) and two-stage (the configurations of FIGS. 6 and 7) compression. In all cases, the basis is 1 MWh of electricity produced by dry compression. As shown in FIG. 8, wet compression produces more power from the same amount of exhaust; therefore, Table 1 shows the correspondingly higher power production for wet compression. Also, Table 1 shows the amount of water that is consumed by the wet compression.

Table 2 shows the economic impact of dry vs. wet compression assuming that electricity is $50/MWh and water is $1.00/m3 ($3.78/thousand gal.).

Table 3 shows the marginal benefit of wet compression, i.e., the extra income derived from the sale of electricity per dollar spent on water. In all scenarios, the marginal benefit is about 15:1 meaning $1 spend on water produces about $15 of additional electricity.

Figure 16:
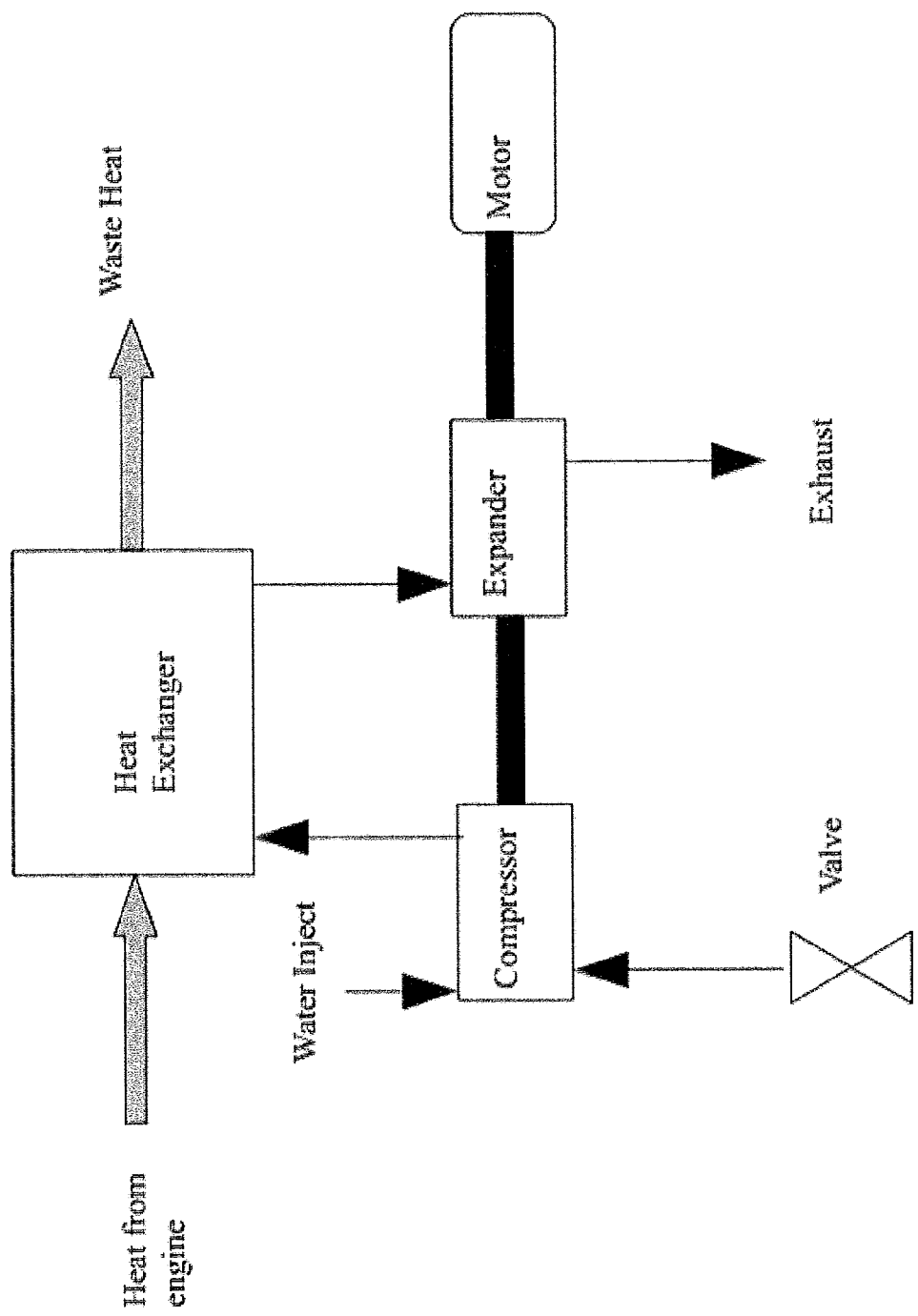
FIG. 16 discusses additional features that may be applicable in certain embodiments.

FIG. 16 discusses additional features that may be applicable certain embodiments. FIG. 16 shows a simple Brayton cycle system with a shaft connected to a StarRotor compressor, expander and electric motor/generator. The only active control component in system is suction valve. Upon generator trip this valve closes. Should less power be desired than is produced then this valve throttled. In the event of emergency, this valve may be closed. The heat exchanger is put into engine exhaust or other suitable heat source. To start the engine the generator is turned as a motor. Then as speed increases motor controls are re-configured for the motor to become a generator. This system is expected to be economical for construction because it consists of very few components.

In particular embodiments, the water injection flow can be modulated to allow the machine to adjust to the off design performance conditions. Modulating the water will modulate the mass flow through the heat exchanger, which in turn, will modulate the volume entering the expander.

Another way to modulate the flow, according to certain configurations, would be to throttle the inlet when the engine was at off design (throttle at less than 100%) conditions. Throttling the inlet would reduce the mass flow into the compressor and create lower pressure air in the exchanger. This is a very simple system as the throttle at inlet control can be used to stop the machine from overspeeding and shut the machine down in the event of emergencies.

Should the engine be producing more than the design conditions air could be vented downstream of the compressor.

Gerotor machines are constant volume machines unless some mechanism is used to change volumetric ratio. The compressor or expander can be modulated utilizing mechanisms described in U.S. Provisional Patent Application No. 61/559,482 U.S. patent Ser. No. 12/749,032 (FIG. 8); and U.S. patent Ser. No. 12/761,432 (FIG. 9), which are all incorporated by reference. The compressor at conditions of off design could have control valves in lieu of check valves that allowed air at a lower pressure to leave the compressor.

In particular embodiments, the cycle name may be best expressed as an Open Brayton Bottoming Cycle.

As described herein, for waste heat recovery, the Brayton cycle offers clear advantages over the Rankine cycle, including higher efficiency, simpler equipment, and more robust operation. Water injection into the Brayton cycle substantially increases power production and is very economical in the example scenario (electricity=$50/MWh, water=$1/m3).

Waste heat is normally available at fairly low temperature (<500° C.). At these low temperatures, for the Brayton cycle to be efficient, in particular embodiments it is essential for the compressor and expander to be efficient (see FIG. 8, providing data for the configuration of FIG. 3). Normally, 80% efficiency is considered decent for a compressor; however, at this efficiency, the cycle performance is very poor. For the cycle to work well, the compressor and expander efficiency must be over 80%, which is difficult to achieve in conventional systems. Traditionally, Brayton cycle engines employ dynamic compressors and expanders (i.e., centrifugal, axial). These machines are not efficient at small scale (50 to 60%). Because most waste heat is available at small scale, it is important to find a compressor and expander that is efficient at such small scales. Further, it is important that the expander function efficiently at high temperatures. Gerotors—in particular StarRotor's gerotor—are unique in their ability to meet these constraints and thereby enable the feasibility of converting waste thermal energy into usable energy.

In addition to the above, in particular embodiments, for the cycle to be efficient, it is essential to minimize power consumption by the compressor. Having an efficient compressor is only part of the solution. To make the cycle work, it is essential to change the nature of what is actually compressed. Injecting liquid water into the compressor reduces the theoretical compression requirements because liquid water cools the air during the compression (see FIG. 8, comparing the configurations of FIG. 3 and FIG. 4). For this to work properly, the compressor must tolerate the presence of liquids. Very few compressors can tolerate liquid injection. Gerotor compressors are unique in their ability to tolerate liquids. Other compressors such as screw compressors and sliding-vane compressors can also tolerate liquids. However, screw compressors and sliding-vane compressors are not feasible because they are inefficient for use in recovery of waste heat.

In most cases, the optimal pressure ratio that achieved the best cycle efficiency cannot be achieved with single-stage compression. Usually, it is necessary to perform two-stage compression. It is desirable to do interstage cooling because the efficiency increases slightly (see FIG. 8 and comparing the configurations of FIGS. 4 and 6). Interstage cooling with water capture cuts water consumption in half (two-stage compression) or a third (three-stage compression), etc. (See Table 1 of FIG. 15.) Water is the only consumable, so reducing its consumption has a major benefit to economics.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. An open brayton bottoming cycle comprising:
   a heat exchanger configured to receive exhaust heat from an engine and supply at least a portion of the exhaust heat to an expander using a fluid, the expander having an inner rotor configured to spin inside an outer rotor;
   a compressor having an inner rotor configured to spin inside an outer rotor, the compressor configured to supply compressed fluid to the heat exchanger, a shaft of the expander connected to the compressor;
   a motor/generator component configured to initially be activated as a motor and then as speed increases, re-configure to become a generator that receives energy from the shaft of the expander;
   a valve configured to supply fluid to the compressor and to trip when the motor/generator component trips and further configured to be throttled when less power is desired; and
   a water injector configured to supply a modulated water flow to the compressor, the modulated water flow modulating a volume entering the heat exchanger and the expander,
   wherein each of the compressor and expander have an isentropic efficiency greater than between 80 and 95 percent and the compressor tolerates a presence of water in the fluid.

2. The open brayton bottoming cycle of claim 1, further comprising an intercooler configured between a first stage and a second stage of the compressor, the intercooler configured to cool the fluid and the water.

3. An open brayton bottoming cycle comprising:
   a heat exchanger configured to receive exhaust heat from a heat source and supply at least a portion of the exhaust heat to an expander using a fluid;
   a compressor configured to supply compressed fluid to the heat exchanger;
   a valve configured to supply fluid to the compressor and to trip when a motor/generator component trips and further configured to be throttled when less power is desired; and
   a water injector configured to supply a water flow to the compressor;
   wherein the expander has a shaft connected to the compressor and configured to supply energy to the compressor,
   wherein the heat source is not configured to burn fuel to drive the shaft; and
   wherein at least one of the compressor and the expander comprises a gerotor having an isentropic efficiency between 80 and 95 percent at a power rating below 500 kilowatts.

4. The open brayton bottoming cycle of claim 3, further comprising a motor/generator component configured to initially be activated as a motor and then as speed increases, re-configure to become a generator that receives energy from the shaft of the expander.

5. The open brayton bottoming cycle of claim 3, further comprising an intercooler configured between a first stage and a second stage of the compressor, the intercooler configured to cool the fluid.

6. The open brayton bottoming cycle of claim 3, further comprising an intercooler configured between a first stage and a second stage of the compressor, the intercooler configured to cool the water flow.

7. The open brayton bottoming cycle of claim 3, wherein the water flow comprises hot water.

8. The open brayton bottoming cycle of claim 3, further comprising a modulator configured to modulate a volume of the water flow entering the heat exchanger and the expander.

9. The open brayton bottoming cycle of claim 3, wherein the heat source comprises an engine and the heat comprises exhaust heat from the engine.

10. An open brayton bottoming cycle method comprising:
    receiving, using a heat exchanger, exhaust heat from a heat source, the heat exchanger supplying at least a portion of the heat to an expander using a fluid;
    supplying, using a compressor, compressed fluid to the heat exchanger; and
    supplying energy to the compressor using the expander,
    tripping a valve when a motor/generator component trips, the valve throttled when less power is desired, wherein the valve is configured to supply fluid to the compressor; and
    supplying a water flow to the compressor using a water injector;
    wherein the heat source is not configured to burn fuel to drive a shaft connected to the compressor or expander; and
    wherein at least one of the compressor or the expander comprises a gerotor having an isentropic efficiency greater than between 80 and 95 percent at a power rating below 500 kilowatts.

11. The open brayton bottoming cycle method of claim 10, further comprising initially activating the motor/generator as a motor and then as speed increases, re-configuring the motor/generator as a generator that receives energy from the shaft of the expander.

12. The open brayton bottoming cycle method of claim 10, further comprising cooling the fluid using an intercooler configured between a first stage and a second stage of the compressor.

13. The open brayton bottoming cycle method of claim 10, further comprising cooling the water flow using an intercooler configured between a first stage and a second stage of the compressor.

14. The open brayton bottoming cycle method of claim 10, further comprising modulating a volume of the water flow entering the heat exchanger and the expander.

* * * * *